Jan. 10, 1933.  F. BARZ  1,894,079
ELECTRIC VALVE CONVERTING SYSTEM
Filed May 5, 1932
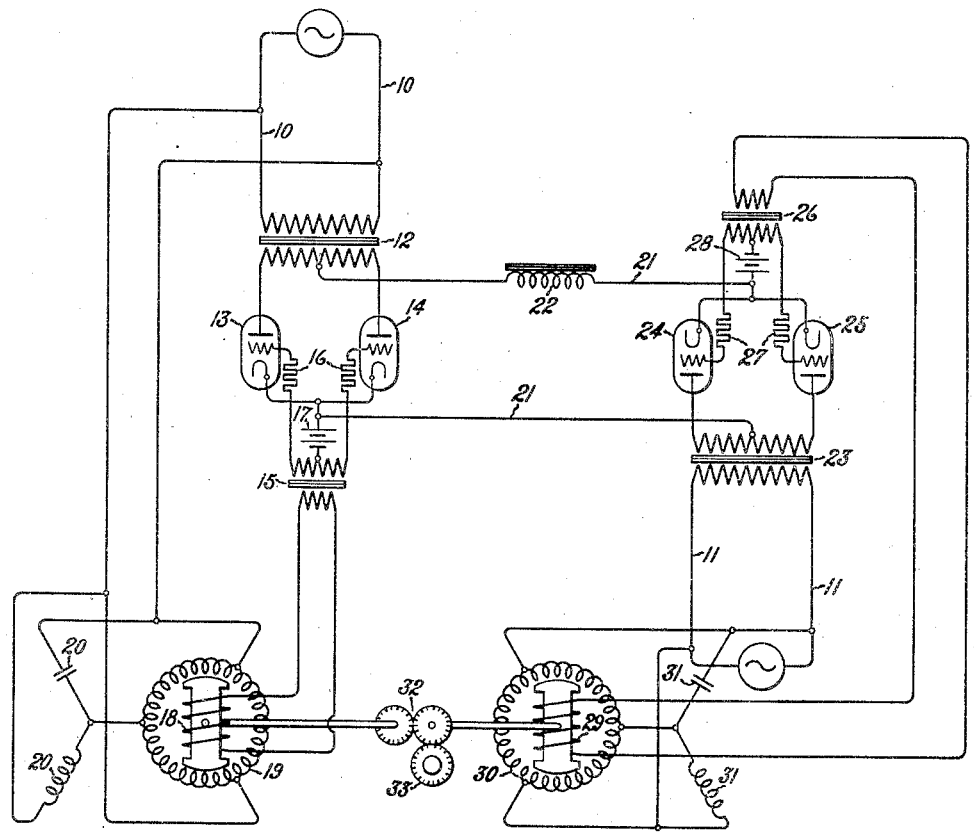
Inventor:
Friedrich Barz,
by Charles E. Tullar
His Attorney.

Patented Jan. 10, 1933

1,894,079

UNITED STATES PATENT OFFICE

FRIEDRICH BARZ, OF BERLIN-LANKWITZ, GERMANY, ASSIGNOR TO GENERAL ELECTRIC COMPANY, A CORPORATION OF NEW YORK

ELECTRIC VALVE CONVERTING SYSTEM

Application filed May 5, 1932, Serial No. 609,540, and in Germany May 22, 1931.

My invention relates to electric valve converting systems, and more particularly to such systems suitable for transmitting energy between independent alternating current circuits of the same or different frequencies.

In some cases it has been found advantageous, particularly in metropolitan areas, to provide two alternating current systems of different frequencies extending over the same territory. For example, 25 cycle energy has been found particularly suitable for certain power purposes including electric railways, while such a frequency is too low for general distribution, for which 60 cycle energy is usually adopted. It frequently becomes desirable to interchange energy between such independent systems operating at the same or different frequencies in case one system is provided with surplus generating capacity, or in case the load peaks of the two systems come at different times of the day. In U. S. Letters Patent No. 1,667,672, granted April 24, 1928, upon the application of S. P. Nixdorff, there is disclosed an electric valve converting system suitable for transmitting energy in either direction between independent alternating current circuits. With the arrangement illustrated in that patent, however, it is not possible to control the amount of the current transmitted between the circuits nor to provide a smooth transition through zero when the direction of transmission of the energy is reversed. My invention relates to an improved electric valve converting system of the type illustrated in the above mentioned patent.

It is an object of my invention, therefore, to provide an improved electric valve converting system suitable for transmitting energy between independent alternating current circuits of the same or different frequencies which will overcome the above mentioned disadvantages of the arrangements of the prior art and which will be simple and reliable in operation.

It is another object of my invention to provide an improved electric valve converting system suitable for transmitting energy between alternating current circuits of the same or different frequencies in which the amount and direction of the energy transmitted between the systems may be readily controlled.

It is a further object of my invention to provide an improved electric valve converting system suitable for transmitting energy between alternating current circuits of the same or different frequencies in which the flow of energy between the two circuits may be smoothly varied between its maximum values in opposite directions.

In accordance with one embodiment of my invention two independent alternating current circuits of the same or different frequencies are interconnected through an electric valve rectifier, a direct current circuit, and an electric valve inverter. Both the rectifier and inverter include a group or grid controlled electric valves and the grids of the valves of each group are energized from its associated alternating current circuit through a rotary phase shifting transformer. Means are provided for simultaneously varying the settings of the two rotary phase shifting transformers in order to vary simultaneously the phase relations of the currents transmitted by the rectifier and inverter with respect to the electromotive forces of their associated alternating current circuits and thus the energy transmitted between the circuits.

For a better understanding of my invention together with other and further objects thereof, reference is had to the following description taken in connection with the accompanying drawing and its scope will be pointed out in the appended claims. The single figure of the accompanying drawing illustrates my invention as applied to an arrangement for transmitting energy between two independent single phase alternating current circuits of the same or different frequencies.

Referring now to the drawing, there is illustrated an arrangement for transmitting energy from an alternating current circuit 10 to an independent alternating current circuit 11 of the same or a different frequency. While I have illustrated both alternating current circuits as single phase systems for the sake of simplicity, it will be obvious to those skilled in the art that either or both of the circuits may be polyphase, if so desired, without departing from my invention. This arrangement includes an electric valve rectifier connected to the circuit 10 and comprising a transformer 12 and a pair of electric valves 13 and 14 connected in a conventional manner to obtain full wave rectification. Electric valves 13 and 14 are each provided with an anode, a cathode and a control grid and may be of any of the several types well known in the art, although I prefer to use valves of the vapor electric discharge type. The grids of the electric valves 13 and 14 are connected to their common cathode circuit through opposite halves of the secondary winding of a grid transformer 15, current limiting resistors 16, and a negative bias battery 17, although in some instances the bias battery may be omitted. The primary winding of the grid transformer 15 may be energized from any alternating current circuit synchronous with the circuit 10, but variable in phase with respect to the electromotive force thereof, as for example, from the secondary winding 18 of a rotary phase shifting transformer 19 energized from the circuit 10 through a phase splitting device 20. The direct current output circuit 21 of the above described rectifier preferably includes a smoothing reactor 22 and is connected to the alternating current circuit 11 through an inverting apparatus comprising a transformer 23 and a pair of electric valves 24 and 25. The valves 24 and 25 are each provided with an anode, a cathode and a control grid and are also preferably of the vapor electric discharge type. The grids of the valves 24 and 25 are connected to their common cathode circuit through opposite halves of the secondary winding of a grid transformer 26, current limiting resistors 27 and a negative bias battery 28, which in some cases may be omitted. The primary winding of the grid transformer 26 is connected to be energized from an alternating current circuit synchronous with the alternating current circuit 11, but variable in phase with respect to the electromotive force thereof, as for example, from the secondary winding 29 of a rotary phase shifting transformer 30, the primary winding of which is connected to the alternating current circuit 11 through a phase splitting arrangement 31. The secondary members of the rotary phase shifting transformers 19 and 30 are interconnected through the gearing 32 adapted to be operated by an adjusting dial 33. With such an arrangement, the phase of the grid potentials of the pairs of valves 13 and 14 and 24 and 25 may be adjusted simultaneously and in an opposite sense.

The general principles of operation of the rectifying and inverting apparatus described above will be well understood by those skilled in the art. With one of the converting apparatus, for example, that comprising the transformer 12 and electric valves 13 and 14 operating as a rectifier, it is well understood that the average voltage of the direct current circuit 21, and thus the average energy transmitted through the apparatus, may be decreased by retarding the phase of the potentials supplied to the grids of the valves 13 and 14 from the rotary phase shifting transformer 19. With the reactor 22 included in the direct current circuit, the average output of the apparatus, when operating as a rectifier, will be reduced substantially to zero when the grid potentials of the valves 13 and 14 are retarded substantially ninety electrical degrees behind their respective anode potentials. On the other hand, with this apparatus operating as an inverter, for a given voltage of the direct current circuit 21, the energy transmitted through the apparatus may be increased by advancing the phase of the grid potentials from phase coincidence with their respective anode potentials.

In explaining the operation of the apparatus as a whole, it will be assumed that it is desired to transmit energy from the alternating current circuit 10 to the alternating current circuit 11. Under these conditions, the rotary phase shifting transformers 19 and 30 will be so adjusted that the grid potentials of the electric valves 24 and 25 are advanced with respect to their respective anode potentials by an angle sufficient to produce commutation, which may be only a few electrical degrees. At the same time the grid potentials of the valves 13 and 14 will be slightly retarded with respect to their anode potentials by a similar commutating angle. Under these conditions the maximum energy will be transferred from the alternating current circuit 10 to the alternating current circuit 11. For this operation it is necessary that the average voltage of the circuit 10 be somewhat higher than that of the circuit 11, taking into consideration the ratios of transformation of the transformers 12 and 23, or that the initial setting of the rotary phase shifting transformers 19 and 30 be such that the grid potentials of the valves 24 and 25 are advanced by an angle slightly greater than the angle by which the grid potentials of the valves 13 and 14 are retarded.

If now it is desired to reduce the amount of energy transmitted from the circuit 10 to the circuit 11, the adjustable dial 33 is operated to simultaneously retard the grid potentials of the valves 13 and 14 and advance the grid potentials of the valves 24 and 25. This operation reduces the average voltage supplied by the rectifying apparatus but at the same time increases the effective voltage ratio between the alternating current circuit 11 and the direct current circuit 21 so that the average energy flow is not reduced in the same ratio as the voltage of the direct current circuit 21. As the grid voltage of the valves 13 and 14 approaches ninety degrees lagging, and hence the grid potentials of the valves 24 and 25 approach ninety degrees leading, the average voltage of the direct current circuit 21 will be reduced to zero as will also the energy transmitted between the circuits 10 and 11. By further retarding the grid potentials of the valves 13 and 14 the voltage supplied by the rectifying apparatus of the circuit 21 becomes a negative voltage, that is, the rectifying apparatus operates as an inverter absorbing power from the direct current circuit 21. Similarly, the converting apparatus comprising the valves 24 and 25 and the transformer 23 now supply a positive voltage to the direct current circuit 21 and operate as a rectifier and energy will flow from the alternating current circuit 11 to the alternating current circuit 10. By further retarding the grid potentials of the valves 13 and 14 to nearly one hundred eighty degrees lagging, that is, a few degrees leading and simultaneously advancing the phase of the grid potentials of the valves 24 and 25, maximum energy will flow from the circuit 11 to the circuit 10, it only being necessary that the grid potentials of the valves 13 and 14 should not be retarded beyond the angle necessary to effect commutation, that is, a few electrical degrees leading. With such an arrangement it is seen that there is a smooth transition between the maximum flow of energy in one direction and the maximum flow of energy in the opposite direction, thus avoiding any shocks to the system upon the reversal of energy flow and at the same time making it possible to control the amount of energy transmitted in either direction as desired.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric valve converting system comprising a first alternating current circuit, a direct current circuit, electric valve converting means for transmitting energy therebetween, a second alternating current circuit, a second electric valve converting means for transmitting energy between said direct current circuit and said second alternating current circuit, and means for simultaneously varying the phase of the currents transmitted by said valve converting means with respect to the electromotive forces of their respective alternating current circuits.

2. An electric valve converting system comprising an alternating current supply circuit, an electric valve rectifier energized from said supply circuit, an alternating current load circuit, an electric valve inverter for transmitting the rectified current to said load circuit, and means for simultaneously varying the phase of rectifier and inverter currents with respect to the electromotive forces of their respective alternating current circuits.

3. An electric valve converting system comprising a first alternating current circuit, a direct current circuit, means for transmitting energy therebetween including a group of electric valves each provided with a control grid, a second alternating current circuit, means for transmitting energy between said direct current circuit and said second alternating circuit including a second group of electric valves each provided with a control grid, means for impressing upon the grids of each group of valves an alternating potential synchronous with its associated alternating current circuit, and means for simultaneously varying the phase of said alternating potentials in an opposite sense.

4. An electric valve converting system comprising a first alternating current circuit, a direct current circuit, a rectifier interconnecting said circuits and including a group of electric valves each provided with a control grid, a second alternating current circuit, an inverter interconnecting said direct current circuit and said second alternating current circuit and including a second group of electric valves each provided with a control grid, a rotary phase shifting transformer for exciting the grids of each group of valves from its associated alternating current circuit, and means for simultaneously varying the setting of said phase shifting transformers in an opposite sense.

In witness whereof, I have hereunto set my hand.

FRIEDRICH BARZ.